(12) United States Patent
Carrillo et al.

(10) Patent No.: US 6,543,744 B2
(45) Date of Patent: Apr. 8, 2003

(54) SOLENOID VALVE

(75) Inventors: Conrado Carrillo, Chihuahua (MX); Lorenzo Guadalupe Rodriquez, El Paso, TX (US); Yingjie Lin, El Paso, TX (US); Jean-Francois Pelka, El Paso, TX (US); Amiyo K. Basu, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/882,230

(22) Filed: Jun. 15, 2001

(65) Prior Publication Data

US 2002/0190234 A1 Dec. 19, 2002

Related U.S. Application Data

(63) Continuation-in-part of application No. 09/567,933, filed on May 10, 2000, now Pat. No. 6,347,616.

(51) Int. Cl.$^7$ ................................................ F16K 31/02
(52) U.S. Cl. ............................ 251/129.08; 251/129.15
(58) Field of Search ............................ 251/129.08, 121, 251/122, 123, 124, 129.22, 129.15, 903; 137/903

(56) References Cited

U.S. PATENT DOCUMENTS

| | | | | |
|---|---|---|---|---|
| 2,891,570 A | * | 6/1959 | Krupp ........................ | 137/509 |
| 3,556,468 A | * | 1/1971 | Cedric et al. ............... | 251/121 |
| 4,643,393 A | * | 2/1987 | Kosugi et al. ........... | 251/129.01 |
| 4,647,008 A | * | 3/1987 | Shirai et al. ............ | 251/129.07 |
| 4,936,543 A | * | 6/1990 | Kamibayasi ........... | 251/129.15 |
| 4,961,561 A | * | 10/1990 | Kamibayasi ................ | 251/120 |
| 5,014,667 A | * | 5/1991 | Meyer ......................... | 123/360 |
| 5,067,688 A | * | 11/1991 | Tanimoto et al. ...... | 251/129.18 |
| 5,156,184 A | * | 10/1992 | Kolchinsky .............. | 137/454.5 |
| 5,282,329 A | * | 2/1994 | Teranishi ............... | 137/596.17 |
| 5,346,175 A | * | 9/1994 | Hunnicutt .............. | 251/129.08 |
| 5,462,253 A | * | 10/1995 | Asthana et al. ............. | 251/121 |
| 5,565,832 A | * | 10/1996 | Haller et al. ................. | 335/249 |
| 5,851,002 A | * | 12/1998 | Carter ......................... | 251/121 |
| 5,967,164 A | * | 10/1999 | Denda et al. ................... | 137/1 |
| 6,062,531 A | * | 5/2000 | Rapp et al. ..................... | 251/50 |
| 6,102,364 A | * | 8/2000 | Busato .................. | 251/129.05 |
| 6,220,275 B1 | * | 4/2001 | Nishinosono et al. ....... | 137/238 |
| 6,223,761 B1 | * | 5/2001 | Najmolhoda et al. ......... | 137/14 |
| 6,242,994 B1 | * | 6/2001 | Li et al. ...................... | 335/277 |
| 6,347,616 B1 | * | 2/2002 | Rodriquez et al. .......... | 123/520 |
| 6,349,703 B1 | * | 2/2002 | Rapp .......................... | 123/458 |

* cited by examiner

*Primary Examiner*—Gene Mancene
*Assistant Examiner*—Frederick C. Nicolas
(74) *Attorney, Agent, or Firm*—Margaret A. Dobrowitsky

(57) ABSTRACT

A solenoid valve includes an outlet tube and a plunger stop. A plunger is slidably disposed within the solenoid valve between the outlet tube and the plunger stop. The plunger is movable between a closed position wherein the plunger engages the outlet tube to block fluid flow through an outlet passage formed in the outlet tube and an open position wherein the plunger is distanced from the outlet tube to permit fluid flow through the outlet passage. The solenoid valve also includes a coil that is energizable to bias the plunger between the closed position and the open position. The plunger stop is configured so that the magnitude of the force of attraction between the plunger and the plunger stop is linearly proportional to the magnitude of the current applied to the coil. Moreover, the magnitude of the force of attraction between the plunger and the plunger stop is independent of the position of the plunger.

20 Claims, 2 Drawing Sheets

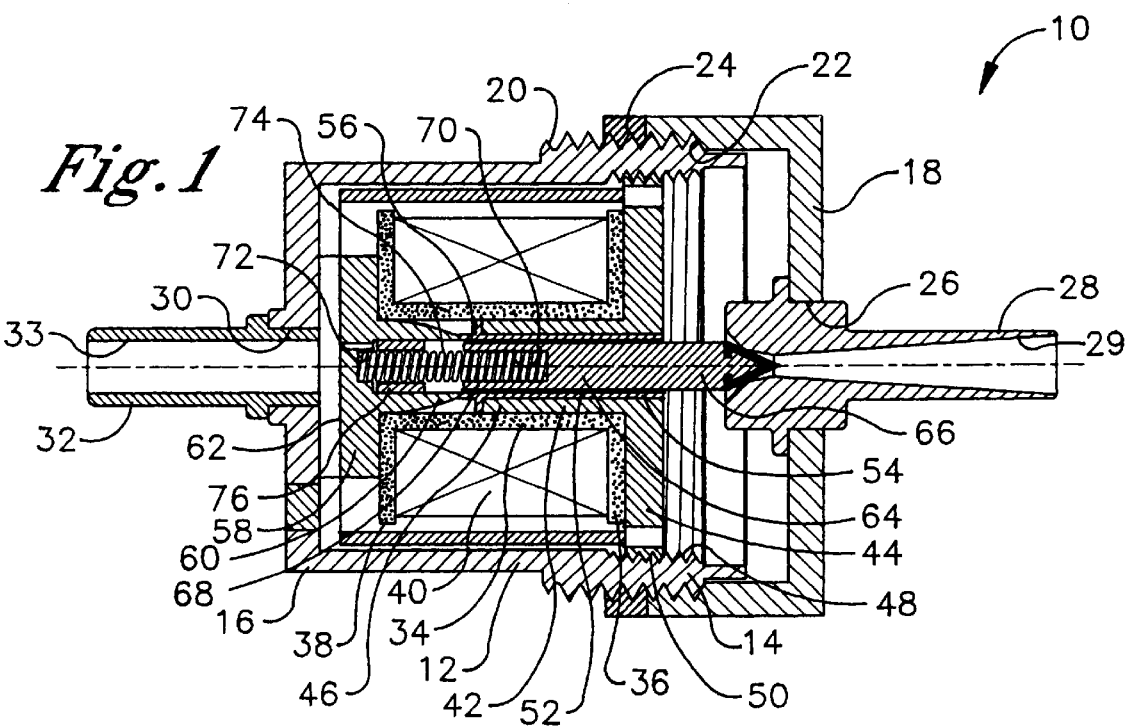
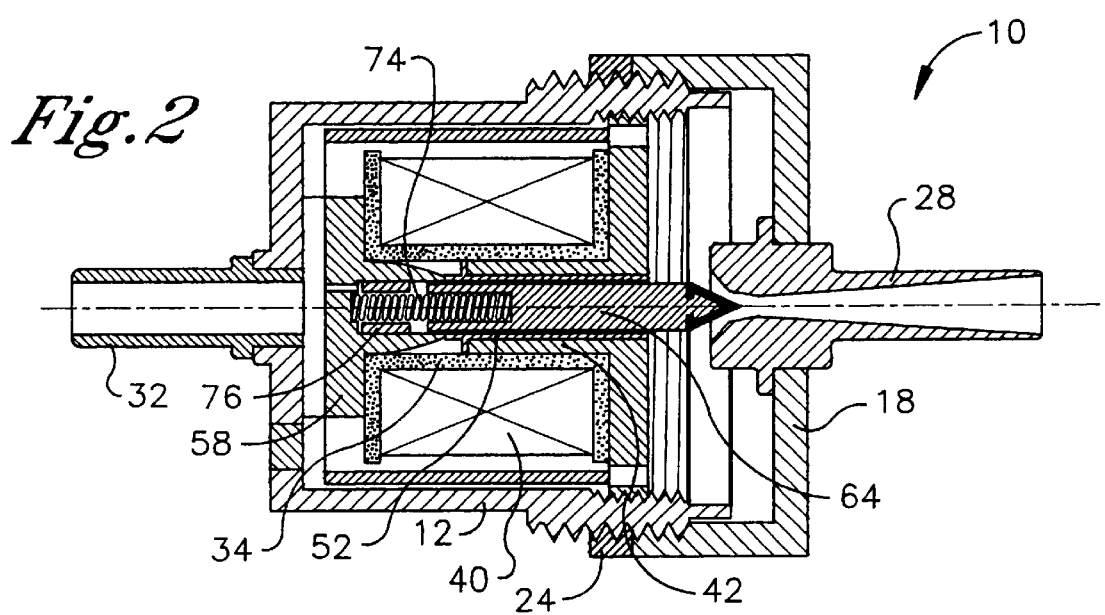

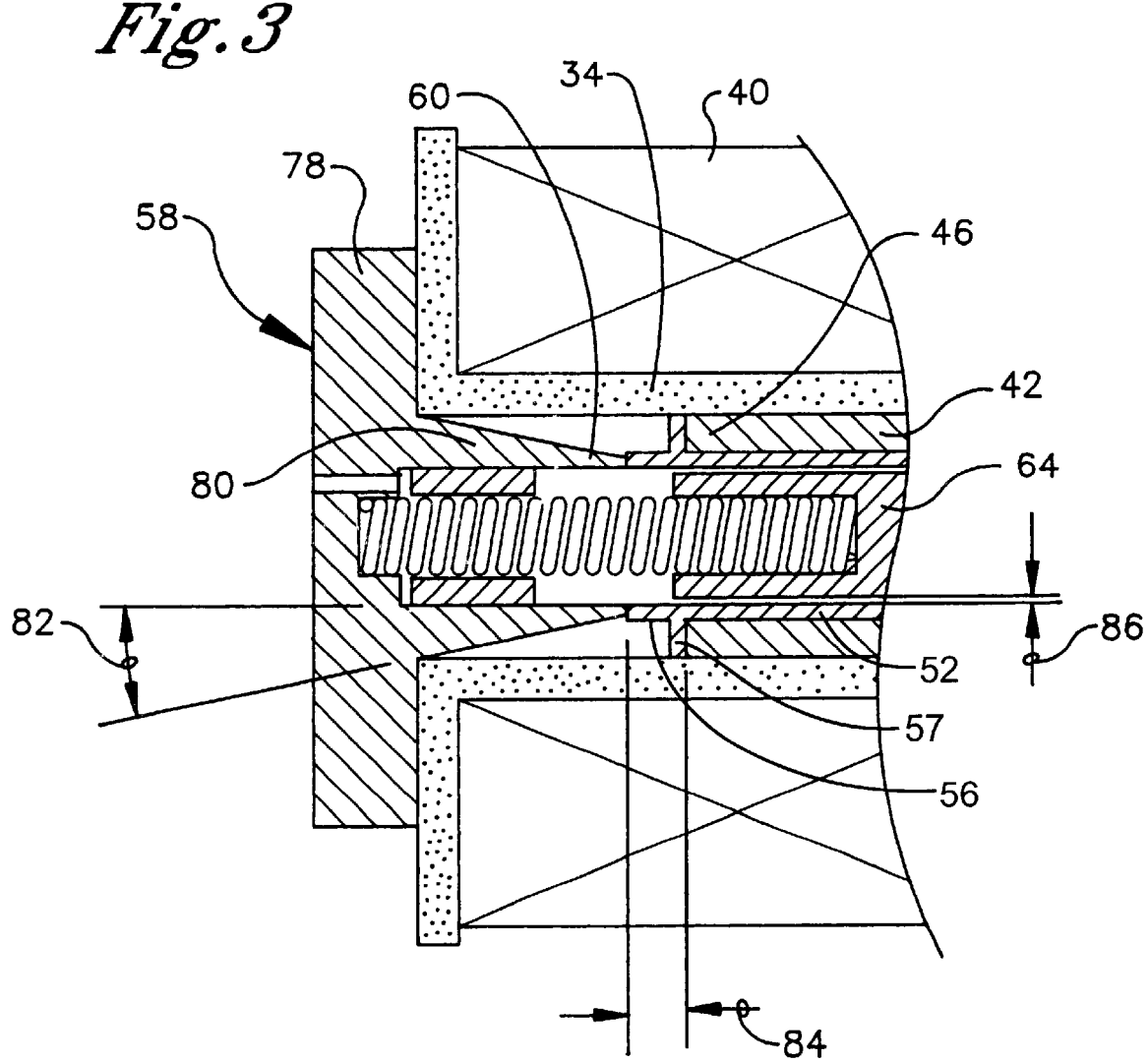

SOLENOID VALVE

This application is a continuation-in-part of U.S. application serial number 09/567,933, now U.S. Pat. No. 6,347,616 filed May 10, 2000.

TECHNICAL FIELD

The present invention relates to motor vehicle sensors and actuators.

BACKGROUND OF THE INVENTION

In order to comply with state and federal environmental regulations, most motor vehicles are now equipped with a carbon canister installed to trap and store petroleum fuel vapors from the carburetor bowl and/or the fuel tank. With the canister, fuel vapor is not vented to the atmosphere, but is instead trapped in the canister and then periodically purged from the canister into the engine where the fuel vapor is burned along with the air-fuel mixture.

Solenoid valves have been provided that are used to purge the fuel vapor from the carbon canister. Unfortunately, many of these valves are adversely effected by signal noise due to contact between the valve plunger and its corresponding valve seat. Moreover, many of these valves do not provide continuous flow at different valve positions and are unable to provide precise purging at engine idle, i.e., these valves are unable to accurately control the rate of flow through the valve.

As such, the present invention has recognized these prior art drawbacks, and has provided the below-disclosed solutions to one or more of the prior art deficiencies.

SUMMARY OF THE INVENTION

A solenoid valve includes an outlet tube that forms an outlet passage, and a plunger stop. A plunger is slidably disposed within the solenoid valve between the outlet tube and the plunger stop. The plunger is movable between a closed position, wherein the plunger engages the outlet tube to block fluid flow through the outlet passage, and an open position, wherein the plunger is distanced from the outlet tube to permit fluid flow through the outlet passage. The solenoid valve further includes a coil that surrounds the plunger. The coil is energizable to bias the plunger between the closed position and the open position. Moreover, the plunger stop is configured so that the force of attraction between the plunger and the plunger stop is linearly proportional to the current applied to the coil.

In a preferred embodiment, the force of attraction between the plunger and the plunger stop is independent of the position of the plunger. Preferably, the plunger stop includes a solid base. A tapered wall extends from the solid base. In a preferred embodiment, the tapered wall defines a stop angle that is in a range from eleven degrees and sixteen degrees (11° to 16°). Moreover, the valve includes a plunger sleeve that surrounds the plunger and a main air gap is formed between the plunger sleeve and the plunger stop. Preferably, the main air gap is in a range from one-half of a millimeter to two millimeters (0.5 mm to 2.0 mm). The solenoid valve also includes a plunger tube between the plunger and the plunger sleeve. A secondary air gap is formed between the plunger and the plunger stop. In a preferred embodiment, the secondary air gap is in a range from three tenths of a millimeter to fifty-five hundredths of a millimeter (0.3 mm to 0.55 mm).

In another aspect of the present invention, a solenoid valve includes an outlet tube that forms an outlet passage and a plunger stop. The plunger stop includes a solid base and a tapered wall that extends there from. A plunger is slidably disposed within the solenoid valve between the outlet tube and the plunger stop. The plunger is movable between a closed position, wherein the plunger engages the outlet tube to block fluid flow through the outlet passage, and an open position, wherein the plunger is distanced from the outlet tube to permit fluid flow through the outlet passage.

The present invention will now be described, by way of example, with reference to the accompanying drawings, in which:

BRIEF DESCRIPTION OF THE DRAWINGS

FIG. 1 is a plan view of a pneumatic solenoid valve in the closed position;

FIG. 2 is a plan view of the pneumatic solenoid valve in the open position; and

FIG. 3 is a detail view of the plunger stop.

DESCRIPTION OF AN EMBODIMENT OF THE INVENTION

Referring initially to FIGS. 1 and 2, a pneumatic solenoid valve is shown and generally designated 10. As shown in FIGS. 1 and 2, the pneumatic solenoid valve includes a hollow, generally cylindrical case 12 that defines an open proximal end 14 and a closed distal end 16. FIGS. 1 and 2 show an end cap 18 that fits over the open proximal end 14 of the case 12. In a preferred embodiment, the proximal end 14 of the case is formed with external threads 20 and the end cap 18 is formed with internal threads 22. Thus, the end cap 18 is screwed onto the case 12 to enclose the open proximal end 14 thereof. FIGS. 1 and 2 also show a case nut 24 that is screwed onto the proximal end 14 of the case 12. It is to be appreciated that the case nut 24 is used to lock the end cap 18 onto the proximal end 14 of the case 12. As shown, the end cap 18 is formed with a central bore 26 into which an outlet tube 28 formed with an outlet passage 29 is preferably press fitted. Moreover, the distal end 16 of the case 12 is formed with a central bore 30 into which an inlet tube 32 is preferably press fitted. The inlet tube 32 is formed with an inlet passage 33.

Within the case 12 is a preferably plastic, generally "I" shaped spool 34 that defines a proximal end 36 and a distal end 38. A hollow toroidal coil 40 of wire closely surrounds the spool 34. A hollow generally "T" shaped, preferably magnetic plunger sleeve 42 is fitted into the distal end 38 of the spool 34. The plunger sleeve 42 defines a proximal end 44 and a distal end 46. In a preferred embodiment, the proximal end 14 of the case 12 forms internal threads 48 and the proximal end 44 of the plunger sleeve 42 forms external threads 50. As shown, the plunger sleeve 42 is screwed into the case 12 such that the external threads 50 formed by the plunger sleeve 42 engage the internal threads 48 formed by the proximal end 14 of the case 12. It is to be appreciated that the plunger sleeve 42 supports the spool 34 and the plunger tube, described below.

As shown in FIGS. 1 and 2, a generally cylindrical, preferably nonmagnetic plunger tube 52 is installed within the plunger sleeve 42. The plunger tube 52 defines a proximal end 54 and a distal end 56. FIGS. 1 and 2 show a preferably magnetic plunger stop 58 that is preferably press fitted into the distal end 38 of the spool 34. The plunger stop 58 also defines a proximal end 60 and a distal end 62. A preferably metal plunger 64 that defines a proximal end 66 and a distal end 68 is slidably disposed within the plunger tube 52 between the outlet tube 28 and the plunger stop 58. The distal end 68 of the plunger 64 forms a first spring pocket 70 and the plunger stop 58 forms a second spring pocket 72.

Still referring to FIGS. 1 and 2, a spring 74 is installed in compression between the distal end 68 of the plunger 64 and the plunger stop 58 such that one end of the spring 74 is disposed in the first spring pocket 70 and the other end of the spring 74 is disposed in the second spring pocket 72. A preferably non-magnetic spring support collar 76 surrounds a portion of the spring 74. The spring support collar 76 in conjunction with the spring pockets 70, 72 minimize excess lateral motion of the spring 74 and prevent the spring 74 from buckling when it is compressed.

It is to be understood that when the coil 40 is de-energized, the spring 74 biases the plunger 64 toward the outlet tube 28 until the pneumatic solenoid valve 10 is in the closed position, shown in FIG. 1, wherein the proximal end 66 of the plunger 64 engages the outlet tube 28 to block the flow of air through the pneumatic solenoid valve 10. On the other hand when the coil 40 is energized, a magnetic field is created that overcomes the force of the spring and moves the plunger 64 to the left looking at FIGS. 1 and 2 until the pneumatic solenoid valve 10 is in the open position as shown in FIG. 2. In the open position, the proximal end 66 of the plunger 64 is distanced from the outlet tube 28 to allow air to flow through the valve 10. It is to be understood that depending on the current applied to the coil 40, the plunger 64 can be in different positions between the closed position, and the full open position.

Referring now to FIG. 3, the details concerning the configuration of the plunger stop 58 are shown. FIG. 3 shows that the plunger stop 58 includes a solid base 78 from which a generally tapered wall 80 extends perpendicularly. As shown, the tapered wall 80 tapers from the base 78 of the plunger stop 58 to the proximal end 60 of the plunger stop 58. Moreover, the tapered wall 80 defines a stop angle 82. In a preferred embodiment, the stop angle 82 is in a range from eleven degrees to sixteen degrees (11° to 16°).

FIG. 3 shows that the proximal end 60 of the plunger stop 58 is in contact with the distal end 56 of the plunger tube 52. A flange 57 extends radially from the plunger tube 52 near the distal end 56 thereof. The flange 57 prevents the distal end 46 of the plunger sleeve 52 from contacting the proximal end 60 of the plunger stop 58. [However] As such, the proximal end 60 of the plunger stop 58 is distanced from the distal end 46 of the plunger sleeve 52 such that a main air gap 84 is formed linearly between the plunger stop 58 and the plunger sleeve 42. In a preferred embodiment, the main air gap 82 is in a range from one-half millimeters to two millimeters (0.5 mm to 2.0 mm). A secondary air gap 86 is formed radially between the outer surface of the plunger 64 and the inner surface of the plunger tube 52. Preferably, the secondary air gap 86 is in a range from three-tenths of a millimeter to fifty-five hundredths of a millimeter (0.3 mm to 0.55 mm).

Since the wall 80 of the plunger stop 58 is tapered, the volume of material comprising the stop 58 increases from the proximal end 60 of the stop 58 to the base of the stop 78. The variation in the volume of the stop 58 varies the magnetic saturation of the stop 58. Thus, the stop angle 82 regulates the magnetic saturation which in turn, controls the total magnetic flux acting on the plunger 64 and the force of attraction between the plunger 64 and the stop 58. Due to the structure of the stop 58, the plunger 64 does not have a significant effect on the magnetic saturation of the stop 58 and does not effect the magnetic attraction between the plunger 64 and the stop 58. Accordingly, the magnitude of the force of attraction between the plunger 64 and the plunger stop 58 is linearly proportional to the magnitude of the current applied to the coil 40. Moreover, for a particular applied current, the magnitude of the force of attraction between the plunger 64 and the plunger stop 58 is independent of the position of the plunger 64.

With the configuration of structure described above, it is to be appreciated that the movement of the plunger within the solenoid valve can be easily and accurately controlled. Thus, the rate of flow through the valve can be easily and accurately controlled.

While the particular SOLENOID VALVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A solenoid valve, comprising:

an outlet tube forming at least one outlet passage;

a stationary magnetic plunger stop;

a plunger slidably disposed within the solenoid valve, the plunger being movable between a closed position wherein the plunger engages the outlet tube to block fluid flow through the outlet passage and an open position wherein the plunger is distanced from the outlet tube to permit fluid flow through the outlet passage;

a coil surrounding the plunger, the coil being energizable to bias the plunger between the closed position and the open position and the plunger stop including a wall that is configured so that a force of attraction between the plunger and the plunger stop is linearly proportional to a current applied to the coil;

a magnetic plunger sleeve surrounding the plunger, plunger sleeve extending at least partially within the coil; and a non-magnetic plunger tube disposed around the plunger between the plunger and the plunger sleeve, the plunger tube having a flange extending radially therefrom, the flange preventing the plunger stop from contacting an end of the plunger sleeve such that a main air gap is established between the plunger stop and the plunger sleeve.

2. The solenoid valve of claim 1, wherein the force of attraction between the plunger and the plunger stop is independent of a position of the plunger.

3. The solenoid valve of claim 2, wherein the plunger stop includes a solid base and a tapered wall extending therefrom.

4. The solenoid valve of claim 3, wherein the tapered wall defines a stop angle that is in a range from eleven degrees and sixteen degrees (11° to 16°).

5. The solenoid valve of claim 4, further comprising:
a plunger sleeve disposed around the plunger; and
a main air gap formed between the plunger sleeve and the plunger stop.

6. The solenoid valve of claim 5, wherein the main air gap is in a range from one-half of a millimeter to two millimeters (0.5 mm to 2.0 mm).

7. The solenoid valve of claim 1, wherein a secondary air gap is established radially between the plunger and the plunger tube, the secondary air gap being in a range from three tenths of a millimeter to fifty-five hundredths of a millimeter (0.3 mm to 0.55 mm).

8. The solenoid valve of claim 1, further comprising:
a spring disposed between the plunger and the plunger stop, the spring biasing the plunger between the open position and the closed position; and
a spring collar surrounding at least a portion of the spring.

9. The solenoid valve of claim 8, wherein the plunger forms a first spring pocket and the plunger stop forms a second spring pocket, the spring defines a first end and a second end, the first end of the spring being disposed in the first spring pocket, the second end of the spring being disposed in the second spring pocket, and the spring collar being disposed around the spring between the spring pockets.

10. A solenoid valve, comprising:
an outlet tube forming at least one outlet passage;
a stationary plunger stop including a solid base and a tapered wall extending therefrom;
a plunger slidably disposed within the solenoid valve between the outlet tube and the plunger stop, the plunger being movable between a closed position wherein the plunger engages the outlet tube to block fluid flow through the outlet passage and an open position wherein the plunger is distanced from the outlet tube to permit fluid flow through the outlet passage;
a plunger sleeve surrounding the plunger, plunger sleeve extending at least partially within the coil; and
a plunger tube disposed around the plunger between the plunger and the plunger sleeve, the plunger tube having a flange extending radially therefrom, the flange preventing the plunger stop from contacting an end of the plunger sleeve such that a main air gap is established between the plunger stop and the plunger sleeve.

11. The solenoid valve of claim 10, wherein the tapered wall defines a stop angle that is in a range from eleven degrees and sixteen degrees (11° to 16°).

12. The solenoid valve of claim 10, further comprising:
a plunger sleeve disposed around the plunger; and
a main air gap formed between the plunger sleeve and the plunger stop.

13. The solenoid valve of claim 12, wherein the main air gap is in a range from one-half of a millimeter to two millimeters (0.5 mm to 2.0 mm).

14. The solenoid valve of claim 10, wherein a secondary air gap is established radially between the plunger and the plunger tube, the secondary air gap being in a range from three tenths of a millimeter to fifty-five hundredths of a millimeter (0.3 mm to 0.55 mm).

15. The solenoid valve of claim 10, further comprising:
a spring disposed between the plunger and the plunger stop, the spring biasing the plunger between the open position and the closed position; and
a spring collar surrounding at least a portion of the spring.

16. The solenoid valve of claim 15, wherein the plunger forms a first spring pocket and the plunger stop forms a second spring pocket, the spring defines a first end and a second end, the first end of the spring being disposed in the first spring pocket, the second end of the spring being disposed in the second spring pocket, and the spring collar being disposed around the spring between the spring pockets.

17. A solenoid valve, comprising:
an outlet tube forming at least one outlet passage;
a plunger stop;
a plunger slidably disposed within the solenoid valve, the plunger being movable between a closed position wherein the plunger engages the outlet tube to block fluid flow through the outlet passage and an open position wherein the plunger is distanced from the outlet tube to permit fluid flow through the outlet passage;
a coil surrounding the plunger, the coil being energizable to bias the plunger between the closed position and the open position and the plunger stop being configured so that a force of attraction between the plunger and the plunger stop is linearly proportional to a current applied to the coil;
a plunger sleeve surrounding the plunger, plunger sleeve extending at least partially within the coil;
a plunger tube disposed around the plunger between the plunger and the plunger sleeve, the plunger tube having a flange extending radially therefrom, the flange preventing the plunger stop from contacting an end of the plunger sleeve and such that a main air gap is established axially between the plunger stop and the plunger sleeve; and
a secondary air gap formed radially between the plunger and the plunger tube.

18. The solenoid valve of claim 17, wherein the air gap is in a range from three tenths of a millimeter to fifty-five hundredths of a millimeter (0.3 mm to 0.55 mm).

19. A solenoid valve, comprising:
an outlet tube forming at least one outlet passage;
a plunger stop including a solid base and a tapered wall extending therefrom;
a plunger slidably disposed within the solenoid valve between the outlet tube and the plunger stop, the plunger being movable between a closed position wherein the plunger engages the outlet tube to block fluid flow through the outlet passage and an open position wherein the plunger is distanced from the outlet tube to permit fluid flow through the outlet passage;
a plunger sleeve surrounding the plunger, plunger sleeve extending at least partially within the coil;
a plunger tube disposed around the plunger between the plunger and the plunger sleeve, the plunger tube having a flange extending radially therefrom, the flange preventing the plunger stop form contacting an end of the plunger stop and the plunger sleeve; and
a secondary air gap formed radially between the plungfer and the plunger tube.

20. The solenoid valve of claim 19, wherein the air gap is in a range from three tenths of a millimeter to fifty-five hundredths of a millimeter (0.3 mm to 0.55 mm).

* * * * *